Figure 3:
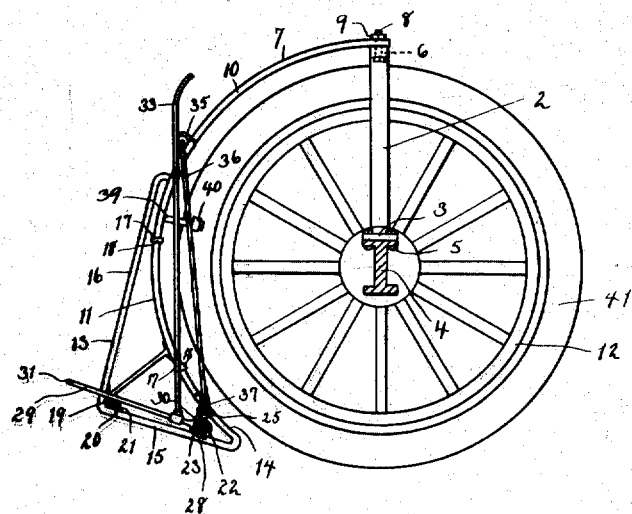

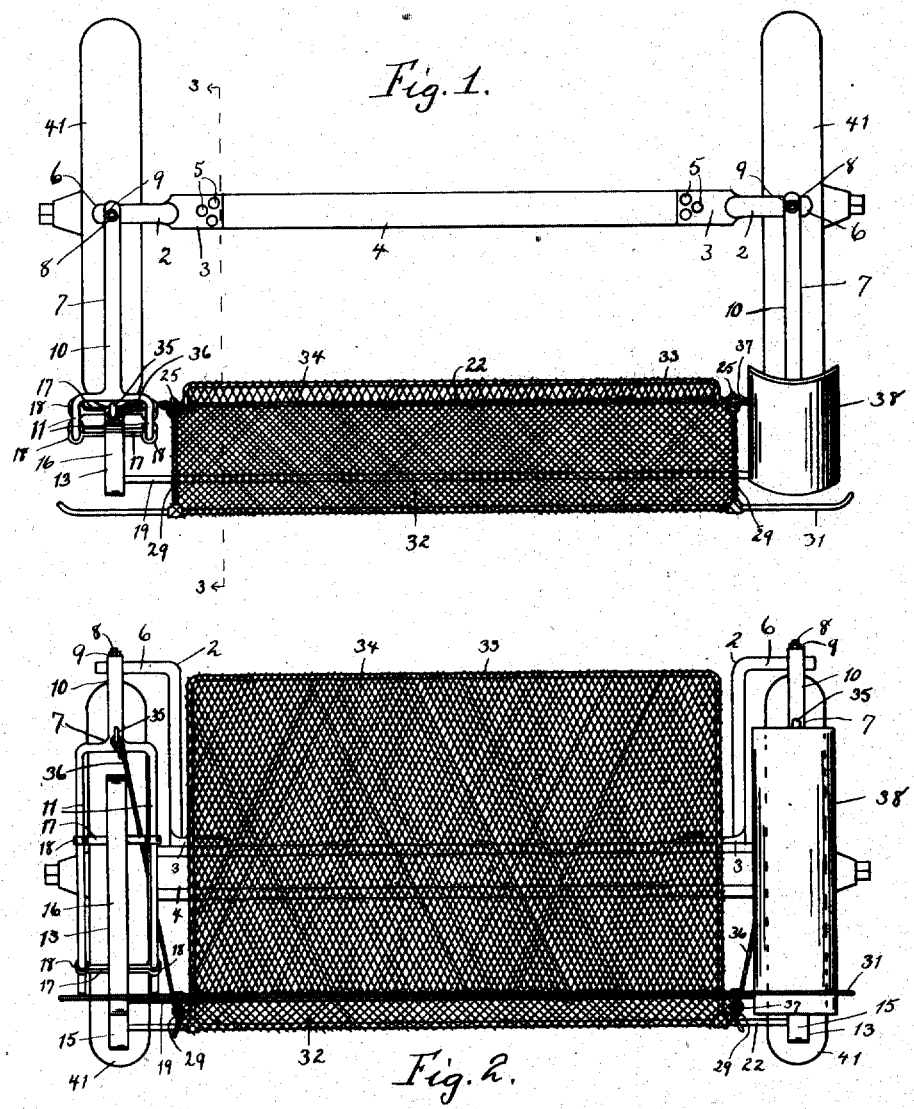

R. THROCKMORTON.
AUTOMOBILE FENDER.
APPLICATION FILED SEPT. 27, 1916.

1,212,850.

Patented Jan. 16, 1917.
2 SHEETS—SHEET 2.

Inventor
Ray Throckmorton
By W. W. Williamson
Attorneys

UNITED STATES PATENT OFFICE.

RAY THROCKMORTON, OF PHILADELPHIA, PENNSYLVANIA.

AUTOMOBILE-FENDER.

1,212,850.      Specification of Letters Patent.      Patented Jan. 16, 1917.

Application filed September 27, 1916. Serial No. 122,401.

*To all whom it may concern:*

Be it known that I, RAY THROCKMORTON, a citizen of the United States, residing at Philadelphia, in the county of Philadelphia and State of Pennsylvania, have invented new and useful Improvements in Automobile-Fenders, of which the following is a specification.

My invention relates to new and useful improvements in automobile fenders, and has for its object to provide an exceedingly simple and effective device of this character which may be supported from the forward axle, chassis, springs or other suitable portion of the vehicle, so that when in use the device will be situated forward of the wheels, the latter being protected by suitable guards which follow the same in their movements to either side when the wheels are turned for steering.

A further object of the invention is to provide an automobile fender having suitable supporting devices on which are slidably mounted skids, the latter adapted to descend to the road bed should the fender contact with a person or object, said skids acting as brakes as soon as they touch the road bed to impede the forward motion of the vehicle.

A still further object of the invention is to mount the supporting means of said skids in such manner as to cause them to move from side to side in unison with the vehicle wheels, when the same are turned for steering; and to provide the skids mounted on said supporting means with suitable guards or shields, so as to partially cover the mechanism and prevent a person or object from coming in contact therewith if hit by the vehicle fender, said guards or shields also preventing the person or object from being run over by the wheels of the vehicle.

Another object of the invention is to provide a simple and unique means for supporting the fender in a raised position, and a tripping means for unlocking the fender to permit the descent thereof.

Still another object of the invention is to provide a pivot supporting means adapted to follow the movements of the wheels of the vehicle, said supporting means having skids slidably mounted thereon adapted to act as brakes when permitted to descend to the road bed, said skids having rods attached thereto by suitable joints, so as not to interfere with the movements of said skids, a catching fender coacting with said rods and detachably supported in a suspended position adapted to be unlocked when the fender strikes a person or object to permit the descent of the fender, and a protecting or shielding fender supported from one of the rods adapted to prevent the person or object from coming in contact with the parts of the vehicle.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application in which—

Figure 4:
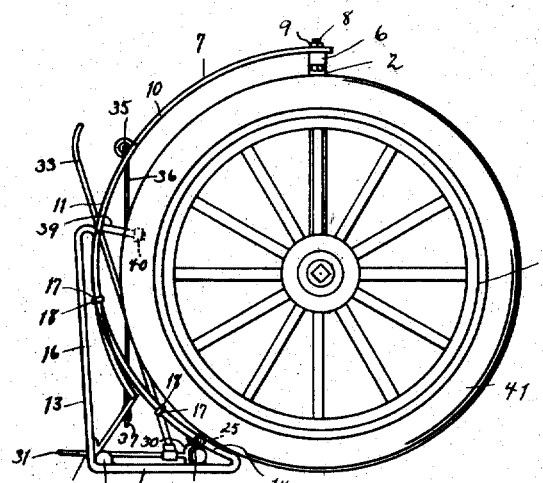
Figure 5:
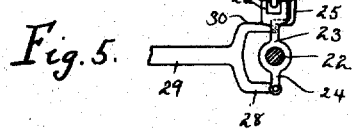
Figure 6:
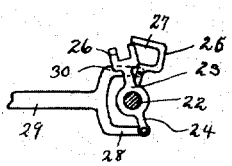

Figure 1, is a plan view of my improved automobile fender, showing it mounted upon the front axle of a vehicle, and showing one of the guards removed. Fig. 2, is a front elevation thereof. Fig. 3, is a section at the line 3—3 of Fig. 1. Fig. 4, is a side elevation thereof. Fig. 5, is an enlarged fragmentary view of the suspending and trigger mechanism, showing it closed; and Fig. 6, is a similar view, showing it open.

In carrying out my invention as here embodied 2 represents a pair of brackets having their lower ends or feet 3 secured to some suitable portion of a vehicle such as the chassis, springs or as here shown the axle 4 by suitable rivets 5 or their equivalent. The upper ends of the brackets 2 project outwardly at right angles to form extensions 6, and to each of these extensions is swiveled or rotatably pivoted a forwardly projecting reach 7 arcuate in shape or curved lengthwise so as to approximately correspond to the curvature of the wheel and adapted to underlie the mud-guards of the vehicle. Said reaches are attached to the bracket 2 in any suitable manner as by a bolt 8 and nut 9, and each of the reaches is in the form of a fork consisting of a body 10 and a pair of parallel arcuate prongs 11, the ends of said prongs terminating some desirable distance above the base of the vehicle wheels 12. Between the prongs of each fork is situated a skid 13 consisting of an arcuate rear wall 14, a bottom wall 15 and a front wall 16 extending between the upper end of the rear wall and the outer end of the bottom wall, so that when the device is situated as shown in Fig. 3, said front wall projects upwardly and rearwardly at an acute angle to the bottom wall. These skids are slidably mounted upon the forked reaches 7 by means of transverse bars or members 17, two of which are preferably used for each skid, the same being fastened to or carried by the rear arcuate wall and having eyes or loops 18 arranged to fit upon the prongs 11 of the forked reaches.

To the forward ends of the skids is connected a forward rod 19, said rod being preferably connected to the skids by means of a ball and socket joint 20 and 21 respectively, the sockets being carried by the bottom walls of the skids, such construction permitting the movement of the skids from side to side without binding. Another rod 22 is attached to the bottom walls of the skids at the rear ends thereof by means of a similar ball and socket joint 20 and 21 respectively. Between the skids upon the rear rod 22 adjacent each end is rotatably mounted the forked suspending latch or member 23 having an arm 24 depending therefrom, and beside the latch member is rotatably mounted upon the rod 22 a catch member 25, the latch member having a socket 26 open at its upper end, while the catch member has a socket 27 open at one side, the sockets of said members when closed or in the position shown in Fig. 5 forming a closed socket.

To the arm of the latch member below the rod 22 is pivoted one of the arms 28 of the bifurcated trigger bar 29, the other arm 30 thereof being pivoted to the catch member 25 above the rod 22, so that the pivot points of the two members are on opposite sides of the rod 22. When the trigger bar 29 is moved rearwardly toward the rod 22, the latch member and the catch member are rotated about said rod 22 in opposite directions, thereby opening the socket 26. As before stated there are two of these combination suspending locks as shown in Figs. 5 and 6, one being mounted adjacent each end of the rod 22, and to these combination suspending locks are attached the pair of trigger bars 29 to the outer ends of which is attached the trigger rod 31, said trigger rod extending transversely across the entire front of the vehicle. The outer ends of the trigger bars 29 are supported by the rod 19, said trigger bars loosely resting thereon and between the trigger rod 31, the rod 22 and the trigger bars 29 is arranged a suitable mesh 32, thereby forming a pick-up fender or fender apron, and to the rod 22 is attached a suitable frame 33, the space between the frame 33 and the rod 22 having disposed there-across a suitable mesh 34 forming an approximately vertical fender or screen, situated in front of the vehicle body to prevent the person or object picked up by the fender from hitting any portion of the vehicle proper and thereby preventing injury to a person struck by the vehicle.

Each of the reaches 7 is provided with an attaching eye 35, to which is fastened one end of a flexible cable 36 having at their lower or free ends, a link or ring 37, the same adapted to enter the socket 26 with one of the fingers of the socket 27 passing into the ring or link, so as to lock the link or ring in position as shown in Figs. 3 and 5. Secured to the outer or front walls 13 of each of the skids is a shield 38 of sufficient width to extend beyond each side of the prongs 11 of the forked reaches, thereby preventing a person or object when hit by the fender from coming in contact with the mechanism, and also preventing the wheels of the vehicle from passing over the person or object hit.

In order that the fender will move from side to side with the wheels as the latter are turned, I provide a roller bracket 39 carried by the forked reaches or by the skids extending rearwardly on the inside of the wheels adjacent thereto, and on each of these roller brackets is mounted a roller 40 adapted to contact with the inside of the tire 41 or the wheel on which said tire is mounted. Where solid tires are used upon the vehicle having a fender of this description attached thereto, said tires need no protection, but it has been found advisable where pneumatic tires are used to secure thereto a suitable tape such as ordinarily known as bicycle tire tape.

When the automobile is running under ordinary conditions the fender will be in the position shown in Figs. 1, 2 and 3, but should the automobile hit a person or object and the fender come in contact with said person or object, the trigger rod 31 will be forced rearwardly causing the latch member 23 and the catch member 25 to be rotated about the rod 22 in opposite directions, so as to open the socket 26, which will permit the locking device to become disengaged from the ring or link 37 of the suspending cable 36 thereto, releasing the fender and permitting the same to descend to approximately the position shown in Fig. 4. In the descent of the fender the skids slide downward upon the forked reaches carrying the pick-up and the vehicle fenders enter the road bed so that the person or object hit will be thrown into the pick-up fender and against the vertical position of the fender, receiving very slight or no injuries at all.

When the fender has descended to the position shown in Fig. 4, the skids will be in contact with the road bed, thereby producing an exceedingly effective brake, and the tendency of the wheels will be to ride up the rear arcuate wall 14 of the skids, so that in some cases the wheels will be entirely lifted from the ground and the weight of the front portion of the vehicle placed upon the skids.

To reset the fender it is only necessary to raise the same by sliding it upon the forked reaches, then inserting the links or rings 37 in the sockets 26 of the locking devices, and then drawing the trigger or tripping rod 31 forward or outwardly, so as to cause the sockets of the latch members and catch member to be drawn toward each other to close the sockets, thereby again suspending the fender as shown in Fig. 3.

Of course I do not wish to be limited to the exact details of construction as here shown, as these may be varied within the limits of the appended claims without departing from the spirit of my invention.

Having thus fully described my invention, what I claim as new and useful, is—

1. An automobile fender comprising a pair of supports having extensions projecting over the wheels of the vehicle to which the fender is attached, forwardly projecting reaches journaled on said supports, so as to rotate from side to side with the wheels of the vehicle, skids slidably mounted upon the reaches, means for detachably suspending said skids, means for actuating the aforementioned means, whereby the skids may be dropped, and a fender apron disposed between the skids.

2. An automobile fender comprising a pair of supports having extensions projecting over the wheels of the vehicle to which the fender is attached, forwardly projecting reaches journaled on said supports, so as to rotate from side to side with the wheels of the vehicle, skids slidably mounted upon the reaches, trigger bars connected with said means, whereby said means may be actuated to permit the descent of the skids, a trigger rod connected with said trigger bars and disposed transversely across the front of the device, a fender apron situated between the skids, and a fender screen projecting upwardly from said apron at the rear thereof.

3. A vehicle fender consisting of a pair of supports having extensions projecting over the wheels of the vehicle to which the fender is attached, arcuate forked reaches pivoted to said supports above the pivot points of the wheels of the vehicle, skids slidably mounted on said forked reaches, a rod having its ends movably attached to said skids, a locking device carried by said rod, means carried by the forked reaches adapted to be attached to said locking means for suspending the skids, means for actuating said locking means when the fender strikes a person or object, a fender apron situated between the skids, and a vertical fender screen also situated between said skids at the rear of the fender apron.

4. A vehicle fender consisting of a pair of supports having extensions projecting over the wheels of the vehicle to which the fender is attached, arcuate forked reaches pivoted to said supports above the pivot points of the wheels of the vehicle, skids slidably mounted on said forked reaches, a rod having its ends movably attached to said skids, a locking device carried by said rod, means carried by the forked reaches adapted to be attached to said locking means for suspending the skids, another rod having its ends movably attached to the skids parallel with the first named rod and spaced therefrom, trigger bars connected with the locking means, a trigger rod attached to said trigger bars whereby the locking means will be actuated when the trigger rod strikes a person or object, and a mesh covering certain parts of the apparatus to form a fender apron.

5. A vehicle fender consisting of a pair of supports having extensions projecting over the wheels of the vehicle to which the fender is attached, arcuate forked reaches pivoted to said supports above the pivot points of the wheels of the vehicle, skids slidably mounted on said forked reaches, a rod having its ends movably attached to said skids, a locking device carried by said rod, means carried by the forked reaches adapted to be attached to said locking means for suspending the skids, another rod having its ends movably attached to the skids parallel with the first named rod and spaced therefrom, trigger bars connected with the locking means, a trigger rod attached to said trigger bars whereby the locking means will be actuated when the trigger rod strikes a person or object, a fender apron arranged between the first named rod, the trigger rod and the trigger bars, a vertical frame connected with the first named rod, a mesh disposed across the space between said rod and frame to form a fender screen, and shields or guards carried by the front walls of the skids of sufficient length and width to cover the forked portion of the reaches.

6. A vehicle fender consisting of supports, forked reaches rotatably mounted thereon projecting over the forward wheels of a vehicle, a skid arranged between the prongs of each of the forked reaches, bars carried by said skids, said bars having eyes slidably mounted upon the prongs of said forked reaches, rods arranged between said skids, means for detachably suspending said skids, and a fender apron situated between said skids.

7. A vehicle fender consisting of supports, forwardly projecting reaches rotatably secured to said supports, skids slidably mounted on said reaches, a catching member arranged between said skids, flexible cables attached to the reaches, a ring or link carried by said flexible cables, locking devices adapted to engage said rings or links, said locking devices each consisting of a latch member having a socket open at its upper end, and a coacting catch member having a socket open at one side, and means for rotating said members in opposite directions.

8. A vehicle fender consisting of supports, forwardly projecting reaches rotatably secured to said supports, skids slidably mounted on said reaches, a catching member arranged between said skids, flexible cables attached to the reaches, a ring or link carried by said flexible cables, locking devices adapted to engage said rings or links, said locking devices each consisting of a latch member having a socket open at its upper end, and a coacting catch member having a socket open at one side, a trigger bar coacting with such locking means having a bifurcated end, one arm of which is pivoted to each member on opposite sides of the fulcrum of said members, and a trigger rod connected to said trigger bars.

In testimony whereof, I have hereunto affixed my signature in the presence of two subscribing witnesses.

RAY THROCKMORTON.

Witnesses:
H. C. BLASE,
W. G. YERGER.

Copies of this patent may be obtained for five cents each, by addressing the "Commissioner of Patents, Washington, D. C."